(12) United States Patent
Labelle et al.

(10) Patent No.: US 10,119,214 B2
(45) Date of Patent: *Nov. 6, 2018

(54) FORCE SPUN SUB-MICRON FIBER AND APPLICATIONS

(71) Applicant: SABIC GLOBAL TECHNOLOGIES B.V., Bergen op Zoom (NL)

(72) Inventors: Jacob Labelle, Pittsfield, MA (US); Richard Peters, Pittsfield, MA (US); Erich Teutsch, Pittsfield, MA (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 410 days.

This patent is subject to a terminal disclaimer.

(21) Appl. No.: 14/329,801

(22) Filed: Jul. 11, 2014

(65) Prior Publication Data

US 2015/0024163 A1    Jan. 22, 2015

Related U.S. Application Data

(60) Provisional application No. 61/847,466, filed on Jul. 17, 2013.

(51) Int. Cl.
*D04H 1/492* (2012.01)
*D04H 3/005* (2012.01)
(Continued)

(52) U.S. Cl.
CPC ......... *D04H 3/009* (2013.01); *B29C 47/122* (2013.01); *D04H 3/105* (2013.01); *D04H 3/11* (2013.01);
(Continued)

(58) Field of Classification Search
None
See application file for complete search history.

(56) References Cited

U.S. PATENT DOCUMENTS

| | | | |
|---|---|---|---|
| 4,141,927 A | 2/1979 | White et al. | |
| 4,655,777 A | 4/1987 | Dunn et al. | |

(Continued)

FOREIGN PATENT DOCUMENTS

| | | |
|---|---|---|
| DE | 19622476 A1 | 12/1997 |
| EP | 0806500 A1 | 11/1997 |

(Continued)

OTHER PUBLICATIONS

Celanese Acetate; Complete Textile Glossary; 2011; Celanese Acetate LLC; 3 pages.
(Continued)

*Primary Examiner* — Lisa L Herring
(74) *Attorney, Agent, or Firm* — Cantor Colburn LLP (57) ABSTRACT

A process of forming a non-woven web including spinning continuous polymeric filaments including one selected from a poly(phenylene ether) component, a poly(phenylene ether)-polysiloxane block copolymer, and combinations thereof. The filaments can have a length to diameter ratio that is more than 1,000,000, and a diameter ranging from 50 nanometers to 5 microns. The spinning can include passing a polymer through a spinneret having a plurality of orifices in a non-electrospinning environment. The process can further include chopping the plurality of continuous filaments and obtaining a plurality of chopped nano-fibers and forming the nano-fibers into a nonwoven web. The spinning can be conducted at a rate of at least 300 grams/hour/spinneret.

27 Claims, 10 Drawing Sheets

(51) Int. Cl.
*B29C 47/12* (2006.01)
*D04H 3/009* (2012.01)
*D04H 3/105* (2012.01)
*D04H 3/11* (2012.01)

(52) U.S. Cl.
CPC .... *Y10T 428/24149* (2015.01); *Y10T 442/681* (2015.04)

(56) References Cited

U.S. PATENT DOCUMENTS

| | | | |
|---|---|---|---|
| 4,810,571 A | 3/1989 | Guthrie | |
| 5,814,349 A | 9/1998 | Geus et al. | |
| 6,001,957 A | 12/1999 | Puyenbroek et al. | |
| 6,495,078 B1* | 12/2002 | Kurihara | D04H 3/04 264/103 |
| 6,656,583 B1* | 12/2003 | Cziollek | D01D 5/16 264/176.1 |
| 7,323,540 B2 | 1/2008 | Velev et al. | |
| 8,551,378 B2 | 10/2013 | Velev et al. | |
| 2005/0032450 A1 | 2/2005 | Haggard et al. | |
| 2005/0064129 A1* | 3/2005 | Dong | C08G 65/46 428/64.2 |
| 2005/0163997 A1* | 7/2005 | Van Trump | B32B 5/08 428/375 |
| 2006/0063882 A1 | 3/2006 | Velev et al. | |
| 2007/0089276 A1* | 4/2007 | Dugan | D01F 1/10 19/144 |
| 2008/0003907 A1 | 1/2008 | Black et al. | |
| 2008/0242171 A1 | 10/2008 | Huang et al. | |
| 2009/0151984 A1 | 6/2009 | Fujimura | |
| 2009/0232920 A1 | 9/2009 | Lozano et al. | |
| 2010/0129628 A1 | 5/2010 | Young | |
| 2010/0139944 A1* | 6/2010 | Guo | C08L 71/12 174/110 SR |
| 2010/0193999 A1 | 8/2010 | Anneaux et al. | |
| 2010/0247908 A1 | 9/2010 | Velev et al. | |
| 2012/0074612 A1 | 3/2012 | Scrivens et al. | |
| 2012/0077404 A1 | 3/2012 | Scrivens et al. | |
| 2012/0077406 A1* | 3/2012 | Scrivens | D04H 1/413 442/351 |
| 2012/0149273 A1* | 6/2012 | Moore | D01D 4/025 442/400 |
| 2012/0292795 A1* | 11/2012 | Peno | D01D 5/18 264/8 |
| 2012/0309250 A1 | 12/2012 | Velev et al. | |
| 2013/0012598 A1 | 1/2013 | Velev et al. | |
| 2013/0078882 A1 | 3/2013 | Yoo et al. | |
| 2014/0061966 A1* | 3/2014 | Bandyopadhyay | C08J 3/203 264/141 |
| 2014/0167329 A1* | 6/2014 | L'Abee | D01D 5/0007 264/465 |
| 2014/0261484 A1* | 9/2014 | Carroll | A24B 15/186 131/306 |
| 2014/0261979 A1* | 9/2014 | Carroll | A24B 15/186 156/167 |
| 2015/0024185 A1 | 1/2015 | Labelle et al. | |
| 2015/0024186 A1 | 1/2015 | Labelle et al. | |
| 2016/0208418 A1 | 7/2016 | Peters et al. | |
| 2017/0226663 A1 | 8/2017 | Labelle et al. | |

FOREIGN PATENT DOCUMENTS

| | | | |
|---|---|---|---|
| WO | 2008157521 A1 | 12/2008 | |
| WO | 2012109215 A2 | 8/2012 | |
| WO | WO-2014100213 A2 * | 6/2014 | D01D 5/0007 |
| WO | 20140134668 A1 | 9/2014 | |

OTHER PUBLICATIONS

International Search Report for International Application No. PCT/US2014/047084, International Filing Date Jul. 17, 2014, dated Oct. 1, 2014, 4 pages.

Liao et al.; "Electrospinning Fabrication of partially crystalline bisphenol A polycarbonate nanofibers: Effects on conformation, crystallinity, and mechanical properties"; European Polymer Journal; vol. 47; 2011; pp. 911-924.

Written Opinion for International Application No. PCT/US2014/047084, International Filing Date Jul. 17, 2014, dated Oct. 1, 2014, 6 pages.

Polycarbonate Plastic and Bisphenol A Release, Human Health and Safety. http://bisphenol-a.org/human/polyplastics.html, Wayback Machine, retrieved Jun. 6, 2012.

Tanisugi, Hideaki et al., "Swelling Behavior of Biphenol A Polycarbonate Polyoxyethylene Multiblock Copolymers in Ethanol/Water Mixtures", Polymer Journal, vol. 16, No. 8, 1984, pp. 633-640.

Alargova et al., "Formation of Polymer Microrods in Shear Flow by Emulsification—Solvent Attrition Mechanism," Langmuir 2006, vol. 22, pp. 765-774.

Mercader et al. "Kinetics of Fiber Solidification," PNAS Oct. 26, 2010, vol. 107, No. 43, pp. 18331-18335.

S.A. White et al., "Resistance of a Polyetherimide to Environmental Stress Crazing and Cracking," J. Applied Polymer Sci., 27, 2675-2682 (1982).

Sutti et al., "Shear-Enhanced Solution Precipitation: A Simple Process to Produce Short Polymeric Nanofibers," Journal of Nanoscience and Nanotechnology, vol. 11, pp. 8947-8952, 2011.

Bhat et al, "Extruded Continuous Filament Nonwovens: Advances in Scientific Aspects," Journal of Applied Polymer Science, vol. 83, p. 572-585 (2002).

Polycarbonate Plastics and Bisphenol A Release Information, http://www.bisphenol-a.org/human/polyplastics.html, retrieved Mar. 6, 2008, Wayback Machine.

* cited by examiner

FORCE SPUN SUB-MICRON FIBER AND APPLICATIONS

CROSS-REFERENCES TO RELATED APPLICATIONS

This application claims benefit under 35 U.S.C. § 119(e) to U.S. Provisional Patent Application Ser. No. 61/847,466 filed on Jul. 17, 2013, which is hereby incorporated by reference in its entirety.

BACKGROUND OF THE INVENTION

1. Field of the Invention

The invention relates generally to a process of forming a non-woven webs including a poly(phenylene ether) component, a poly(phenylene ether) polysiloxane block copolymer, and specifically to a process for forming such webs at a high rate of at least 300 grams/hour/spinneret.

2. Description of the Related Art

Polyphenylene ether (PPE) resins, such as NORYL resins, which are modified PPE/olefin resin *lends that offer toughness, a wide range of stiffness, flame retardancy and are available from SABIC Innovative Plastics, have been converted down to 15 to 20 microns in diameter using the melt spinning process, but haven't been used in the melt blown area. Polybutylene terephthalate (PBT) has been spun to 10-20 micron range via melt spinning, and to 1-10 microns using the melt blown process.

Electro-spinning of these resins is possible, but the cost of the resin and the slow throughput rate of this process have made this method commercially unacceptable. Typical production rates for this process are in the 200 to 300 grams per hour, and 60 meters per minute line speed rates.

These materials would be desirable in many applications and composite structures that require various unique properties of the different resins to perform in the necessary environment. Many of these applications require the resins to be in a fiber size much smaller than currently achievable using conventional methods of fiber production at a reasonable throughput rate. This has been a barrier to the introduction and testing of many of these resins suitability for use in these applications. It would be desirable to use these materials in nano-fiber form produced from the force spinning process in applications such as electrical paper, battery separator membranes, structural composites and filter papers, etc.

BRIEF SUMMARY OF THE INVENTION

According to various embodiments, using a force spinning process, the above-identified materials can be either melt spun or solution spun into fiber diameters in the sub-micron range. Even small decreases in fiber diameters results in substantial increases in the surface area of the resins, thereby increasing the performance benefit that the individual resins bring to the applications. Each of these resin families have been converted to sub-micron fibers using, this process. One advantage this process brings is a reasonable throughput of ultra-fine fibers enabling them to be produced in an economically viable method. Throughput rates as high as 200 to 300 thousand grams per hour are possible, with line speeds as high as 250 meters per minute and higher.

The output of this process is a non-woven web structure of continuous fiber lengths, randomly laid down onto a carrier substrate, or coated onto another functional sheet, film, non-woven or other rolled good product. The resulting product is then packaged as a rolled good to be used in further downstream processes, to produce applications such as membranes, battery separators, filtration media, composites, electrical papers, and honeycomb papers.

BRIEF DESCRIPTION OF THE DRAWINGS

These and other features, aspects, and advantages of the present invention will become better understood with reference to the following description and appended claims, and accompanying drawings where:

It should be understood that the various embodiments are not limited to the arrangements and instrumentality shown in the drawings.

DETAILED DESCRIPTION OF THE INVENTION

The invention provides process of forming a non-woven web including a poly(phenylene ether) component, a poly(phenylene ether)-polysiloxane block copolymer, and combinations thereof at a high rate of at least 300 grams/hour/spinneret.

The present invention may be understood more readily by reference to the following detailed description of preferred embodiments of the invention as well as to the examples included therein. All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

Various embodiments relate to a process of forming a non-woven web. The process can include spinning a plurality of continuous polymeric filaments comprising one selected from a poly(phenylene ether) component, a poly(phenylene ether)-polysiloxane block copolymer, and combinations thereof. The filaments can have a length to diameter ratio that is more than 1,000,000, and a diameter ranging from 50 nanometers to 5 microns, preferably from 50 nanometers to 2 microns. The spinning can include passing a polymer through a spinneret having a plurality of orifices in a non-electrospinning environment. The process can further include chopping the plurality of continuous filaments and obtaining a plurality of chopped nano-fibers and forming the nano-fibers into a non-woven web. The spinning can be conducted at a rate of at least 300 grams/hour/spinneret.

According to various embodiments, none of the plurality of continuous polymeric filaments are bonded to adjacent filaments. According to other embodiments, a portion of the plurality of continuous polymeric filaments can be at least partially bonded to adjacent filaments. According to other embodiments, each of the plurality of continuous polymeric filaments can be at least partially bonded to adjacent filaments. The process can further include entangling the filaments.

The non-woven web can contain less than 10 wt % of a material selected from polyvinyl pyrrolidine, polymethyl methacrylate, polyvinylidene fluoride, polypropylene, polycarbonate, polyethylene oxide, agarose, polyvinylidene fluoride, polylactic glycolic acid, nylon 6, polycaprolactone, polylactic acid, polybutylene terepthalate, polyetherimide homopolymers, polyetherimide co-polymers, polyetherether ketones homopolymers, polyetherether ketones copolymers, polyphenylene sulfones homopolymers, polyphenylene sulfones copolymers, polycarbonate homopolymers, polycarbonate copolymers, and combinations thereof.

Various embodiments relate to a process including spinning a plurality of continuous polymeric filaments by passing at least one polymeric component through a spinneret having a plurality of orifices, and producing a non-woven web comprising the plurality of continuous polymeric filaments.

The at least one polymeric component can include one selected from a poly(phenylene ether) component, a poly(phenylene ether)-polysiloxane block copolymer, and combinations thereof.

Each of the plurality of continuous polymeric filaments can have a length to diameter ratio within a range having a lower limit and/or an upper limit. The range can include or exclude the lower limit and/or the upper limit. The lower limit and/or upper limit can be selected from 500000, 1000000, 1500000, 2000000, 2500000, 3000000, 3500000, 4000000, 4500000, 5000000, 10000000, 15000000, 20000000, 25000000, 30000000, 35000000, 40000000, 45000000, 50000000, 55000000, 60000000, 65000000, 70000000, 75000000, 80000000, 85000000, 90000000, 95000000, 100000000, 105000000, 110000000, 115000000, 120000000, 125000000, 130000000, 135000000, 140000000, 145000000, 150000000, 155000000, 160000000, 165000000, 170000000, 175000000, 180000000, 185000000, 190000000, 195000000, 200000000, 205000000, 210000000, 215000000, 220000000, 225000000, 230000000, 235000000, 240000000, 245000000, 250000000, 255000000, 260000000, 265000000, 270000000, 275000000, 280000000, 285000000, 290000000, 295000000, and 300000000. For example, according to certain preferred embodiments, each of the plurality of continuous polymeric filaments can have a length to diameter ratio that can be more than 1,000,000.

Each of the plurality of continuous polymeric filaments can have a diameter within a range having a lower limit and/or an upper limit. The range can include or exclude the lower limit and/or the upper limit. The lower limit and/or upper limit can be selected from 25, 50, 75, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1025, 1050, 1075, 1100, 1125, 1150, 1175, 1200, 1225, 1250, 1275, 1300, 1325, 1350, 1375, 1400, 1425, 1450, 1476, 1500, 1525, 1550, 1575, 1600, 1625, 1650, 1675, 1700, 1725, 1750, 1775, 1800, 1825, 1850, 1875, 1900, 1925, 1950, 1975, 2000, 2025, 2050, 2075, 2100, 2125, 2150, 2175, 2200, 2225, 2250, 2275, 2300, 2325, 2350, 2375, 2400, 2425, 2450, 2475, 2500, 2525, 2550, 2575, 2600, 2625, 2650, 2675, 2700, 2725, 2750, 2775, 2800, 2825, 2850, 2875, 2900, 2925, 2950, 2975, 3000, 3025, 3050, 3075, 3100, 3125, 3150, 3175, 3200, 3225, 3250, 3275, 3300, 3325, 3350, 3375, 3400, 3425, 3450, 3475, 3500, 3525, 3550, 3575, 3600, 3625, 3650, 3675, 3700, 3725, 3750, 3775, 3800, 3825, 3850, 3875, 3900, 3925, 3950, 3975, 4000, 4025, 4050, 4075, 4100, 4125, 4150, 4176, 4200, 4225, 4250, 4275, 4300, 4325, 4350, 4375, 4400, 4425, 4460, 4475, 4500, 4525, 4550, 4575, 4600, 4625, 4650, 4675, 4700, 4725, 4750, 4775, 4800, 4825, 4850, 4875, 4900, 4925, 4950, 4975, and 5000 nanometers. For example, according to certain preferred embodiments, each of the plurality of continuous polymeric filaments can have a diameter ranging from 50 nanometers to 5 microns, preferably from 50 nanometers to 2 microns.

Table 1 summarizes exemplary length to diameter ratios according to various embodiments.

TABLE 1

| Length (in nanometers) | Diameter (in nanometers) | L/D |
| --- | --- | --- |
| 10,000,000,000 | 50 | 200,000,000 |
| 10,000,000,000 | 100 | 100,000,000 |
| 10,000,000,000 | 500 | 20,000,000 |
| 10,000,000,000 | 1000 | 10,000,000 |
| 8,000,000,000 | 50 | 160,000,000 |
| 8,000,000,000 | 100 | 80,000,000 |
| 8,000,000,000 | 200 | 40,000,000 |
| 8,000,000,000 | 500 | 16,000,000 |
| 8,000,000,000 | 1000 | 8,000,000 |
| 5,000,000,000 | 50 | 100,000,000 |
| 5,000,000,000 | 100 | 50,000,000 |
| 5,000,000,000 | 500 | 10,000,000 |
| 5,000,000,000 | 1000 | 5,000,000 |

The non-woven web can have a width within a range having a lower limit and/or an upper knit. The range can include or exclude the lower limit and/or the upper limit. The lower limit and/or upper limit can be selected from 100, 105, 110, 115, 120, 125, 130, 135, 140, 145, 150, 155, 160, 165, 170, 175, 180, 185, 190, 195, 200, 210, 220, 230, 240, 250, 260, 270, 280, 290, 300, 310, 320, 330, 340, 350, 360, 370, 380, 390, 400, 410, 420, 430, 440, 460, 460, 470, 480, 490, 500, 600, 700, 800, 900, 1000, 1100, 1200, 1300, 1400, 1500, 1600, 1700, 1800, 1900, and 2000 mm. For example, according to certain preferred embodiments, the non-woven web can have a width of at least 150 mm.

Producing the non-woven web can include depositing the plurality of continuous filaments onto one selected from a carrier substrate, a functional sheet, a film, a non-woven, a rolled good product, and combinations thereof.

The carrier substrate can be a reciprocating belt. The process can further include solidifying the plurality of continuous polymeric filaments before the depositing step. The non-woven web can be unconsolidated. The process can further include consolidating the non-woven web. The process can further include consolidating the non-woven web under pressure.

The spinning can be conducted in a non-electrospinning environment.

The spinning can be conducted at a rate within a range having a lower limit and/or an upper limit. The range can include or exclude the lower limit and/or the upper limit. The lower limit and/or upper limit can be selected from 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 265, 260, 265, 270, 275, 280, 285, 290, 295, 300, 305, 310, 315, 320, 325, 330, 335, 340, 345, 350, 355, 360, 365, 370, 375, 380, 385, 390, 395, 400, 425, 450, 475, 500, 525, 550, 575, 600, 625, 650, 675, 700, 725, 750, 775, 800, 825, 850, 875, 900, 925, 950, 975, 1000, 1500, 2000, 2500, 3000, 3500, 4000, 4500, 5000, 5500, 6000, 6500, 7000, 7500, 8000, 8500, 9000, 9500, 10000, 10500, 11000, 11500, 12000, 12500, 13000, 13500, 14000, 14500, and 15000 grams/hour/spinneret. For example, according to certain preferred embodiments, the spinning can be conducted at a rate of at least 300 grams/hour/spinneret.

Figure 2:
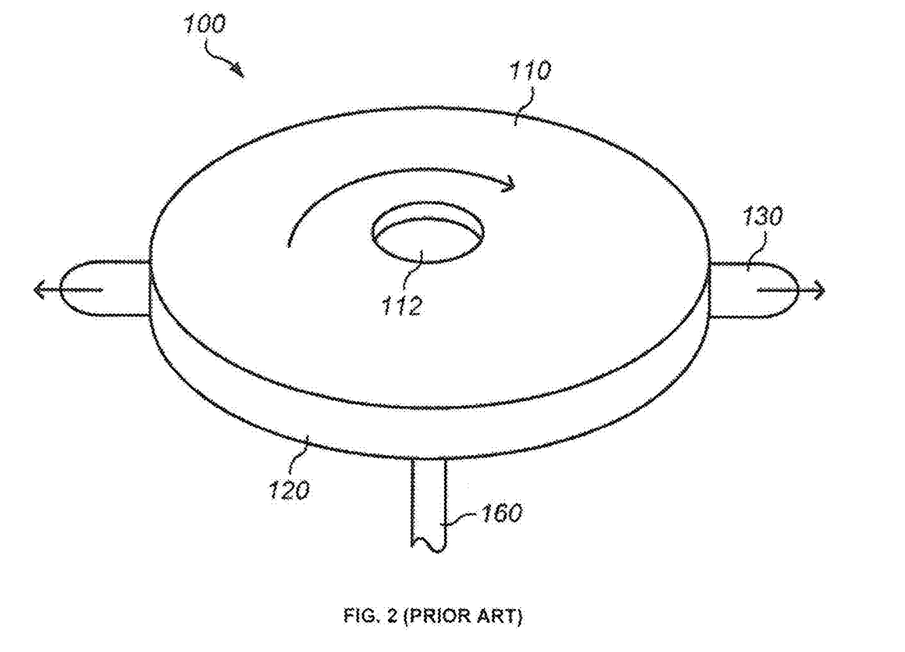
FIG. 2: depicts one or more nozzles coupled to one or more openings of a known fiber producing device.
Figure 3:
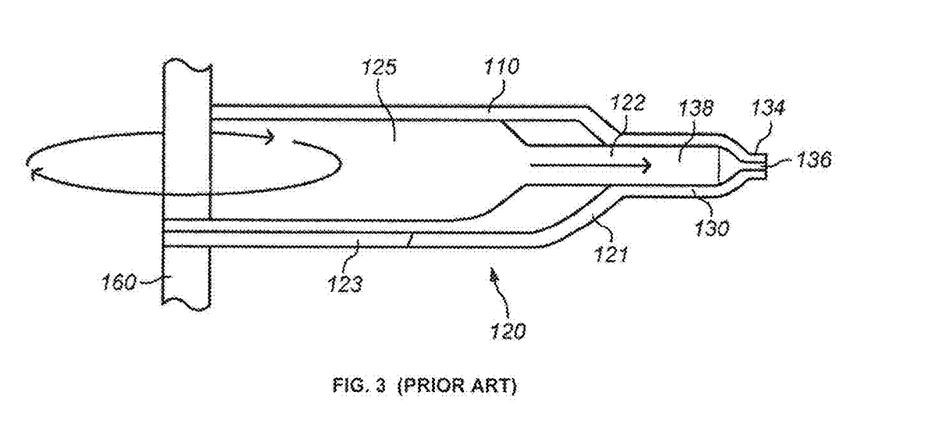
FIG. 3: shows a cross-sectional view of the known fiber producing device of FIG. 2.

The spinning can be conducted by rotating the spinneret at a speed sufficient to spin the filaments under the effect of centrifugal force. FIG. 2 depicts a known fiber producing device 100, as described in WO 2012/109215, the entirety of which is hereby incorporated by reference. As shown in FIG. 2 one or more nozzles 130 may be coupled to one or more openings 122 of fiber producing device 100. As used herein a "nozzle" is a mechanical device designed to control the direction or characteristics of a fluid flow as it exits (or enters) an enclosed chamber or pipe via an orifice. Nozzles may have an internal cavity 138 running through the longitudinal length of the nozzle, as depicted in FIG. 3. Internal cavity 138 may be substantially aligned with opening 122 when nozzle 130 is coupled to an opening. Spinning of fiber producing device 100 causes material to pass thorough one or more of openings 122 and into one or more nozzles 130. The material is then ejected from one or more nozzles 130 through nozzle orifice 136 to produce fibers. Nozzle 130 may include a nozzle tip 134 having an internal diameter smaller than an internal diameter of nozzle internal cavity 138. In some embodiments, internal cavity 138 of nozzle 130 and/or nozzle orifice 136 may have a size and/or shape that causes the creation of microfibers and/or nanofibers by ejecting of the material through the nozzle.

It should be understood that while opposing openings are depicted, the openings may be placed in any position on the body of a fiber producing device. The position of the openings may be varied to create different kinds of fibers. In some embodiments, openings may be placed in different planes of the fiber producing device. In other embodiments, openings may be clustered in certain locations. Such alternate positioning of the openings may increase the fiber dispersion patterns and/or increase the fiber production rates. In some embodiments, the openings, regardless of the position, may accept an outlet element (e.g., a nozzle or needle).

FIG. 3 shows a cross-sectional view of fiber producing device of FIG. 2. Body 120 includes one or more sidewalls 121 and a bottom 123 which together define an internal cavity 125. In one embodiment, body 120 is substantially circular or oval and includes a singular continuous sidewall 121, for example, sidewall and bottom are a single, unitary component of the fiber producing device. Openings 122 are formed in sidewall 21 of body 120, extending through the sidewall such that the opening allows transfer of material from internal cavity 125 through the sidewall. In an embodiment, sidewall 121 is angled from bottom 123 toward one or more openings 122. Alternatively, sidewall 121 may be rounded from bottom 123 toward one or more openings 122.

Having an angled or rounded sidewall extending toward one or more openings facilitates flow of material in the body toward the openings when the fiber producing device is being rotated. As the fiber producing device is rotated the material rides up the angled or rounded walls toward the openings. This minimizes the occurrence of regions where material is inhibited from traveling toward the openings.

According to various embodiments, each of the plurality of continuous polymeric filaments is provided with at least one additional functionality imparting therapeutic activity, catalytic activity microelectronic activity, micro-optoelectronic activity, magnetic activity, and/or biological activity.

According to some embodiments, none of the plurality of continuous polymeric filaments are bonded to adjacent filaments. According to other embodiments, a portion of the plurality of continuous polymeric filaments are at least partially bonded to adjacent filaments. According to other embodiments, each of the plurality of continuous polymeric filaments are at least partially bonded to adjacent filaments. The process can further include entangling the filaments. The entangling can be one of needle-punching and fluid hydroentangement.

The poly(phenylene ether) component can include repeating structural units having the formula:

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and wherein each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

The poly(phenylene ether)-polysilaxane block copolymer can be prepared by an oxidative copolymerization method. The poly(phenylene ether) component can include a homopolymer or copolymer of monomers selected from the group consisting of 2,6 dimethylphenol, 2,3,6 trimethylphenol, and combinations thereof. The polymeric component can be in, the form of a solution including the poly(phenylene ether) component in a solvent.

According to various embodiments, the process can further include at least partially removing the solvent from the filament before the filament is deposited. The solvent can be a chlorinated solvent. The solvent can be at least one selected from benzene, toluene, xylene, chlorobenzene, chloroform, carbon tetrachlorides, alcohols, ketones, anisole, veratrole, dichloroethane, trichloroethane and combinations thereof.

The non-woven web can contain less than 10 wt % of a material selected from polyvinyl pyrrolidine, polymethyl methacrylate, polyvinylidene fluoride, polypropylene, polycarbonate, polyethylene oxide, agarose, polyvinylidene fluoride, polylactic glycolic acid, nylon 6, polycaprolactone, polylactic acid, polybutylene terephthalate, polyetherimide homopolymers, polyetherimide co-polymers, polyetherether ketones homopolymers, polyetherether ketones copolymers, polyphenylene sulfones homopolymers, polyphenylene sulfones copolymers, polycarbonate homopolymers, polycarbonate copolymers, and combinations thereof. The can exclude any detectable amount of a material selected from polyvinyl pyrrolidine, polymethyl methacrylate, polyvinylidene fluoride, polypropylene, polycarbonate, polyethylene oxide, agarose, polyvinylidene fluoride, polylactic glycolic acid, nylon 6, polycaprolactone, polylactic acid, polybutylene terephthalate, and combinations thereof.

Other embodiments relate to a product produced by the process according to any of other embodiments. The product can be at least one selected from non-woven paper, medical implants, ultra-fine filters, membranes, hospital gowns, electrical insulation paper, honeycomb structures and personal hygiene products, dialyzers, blood, oxygenator filters, intravenous (IV) filters, diagnostic test filters, and blood/apheresis filters. The can be a composite non-woven product including the spun filaments and at least one other fiber. The product can be a composite non-woven product adhered to a rolled sheet good. The product can be a composite non-woven product adhered to at least one of a sheet or film.

The invention is further described in the following illustrative examples in which all parts and percentages are by weight unless otherwise indicated.

EXAMPLES

Figure 1A:
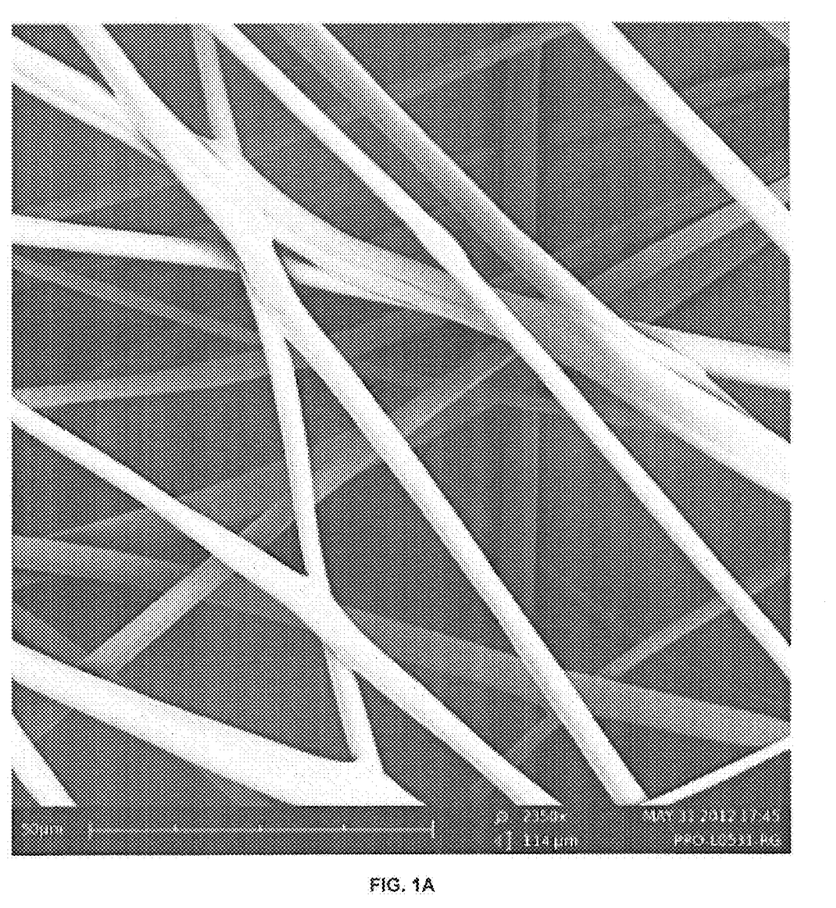
FIG. 1A: is a photomicrograph, at a magnification of 2350 times, of a force spun poly(phenylene ether) fiber.
Figure 1B:
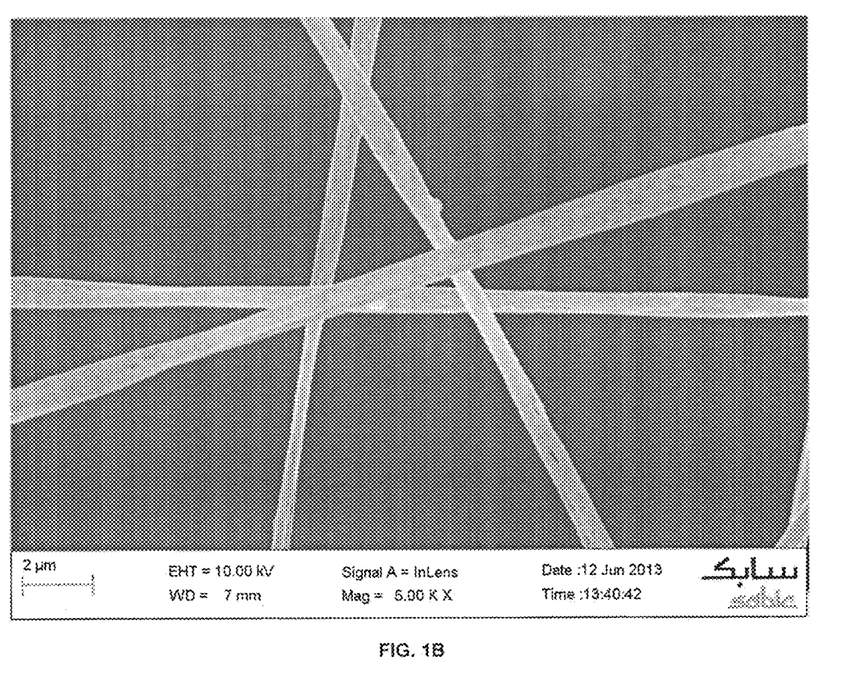
FIG. 1B: is a photomicrograph, at a magnification of 5,000 times, of a force spun poly(phenylene ether) fiber.
Figure 1C:
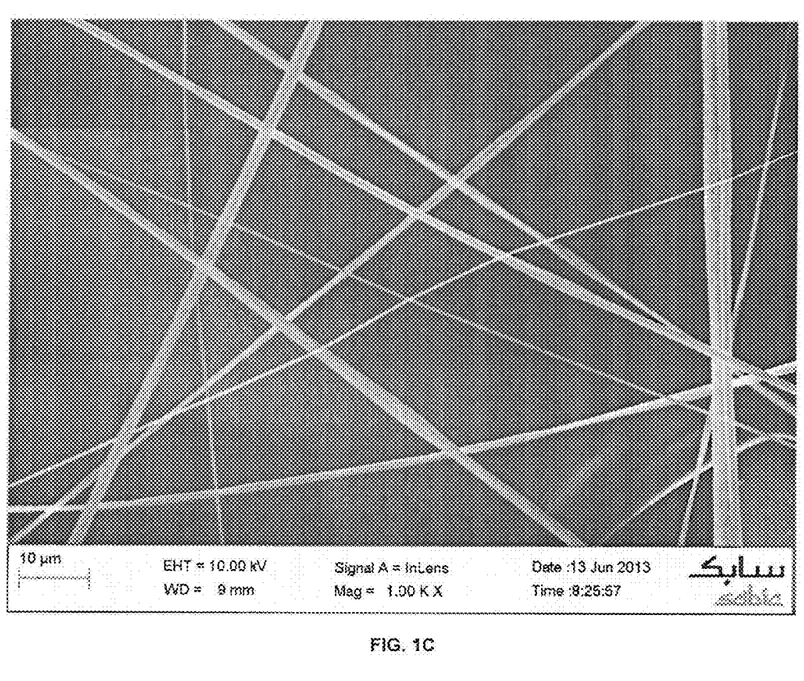
FIG. 1C is a photomicrograph, at a magnification of 1,000 times, of a force spun poly(phenylene ether) fiber.

Several variations of PPE resins, were solution spun to average fiber diameters in the sub-micron range. FIGS. 1a-c shows an example of the results of solution force spinning into sub-micron fibers. Table 2 provides a list of materials used in the examples.

TABLE 2

| Component | Chemical Description | Source |
|---|---|---|
| PPO6130 | Polyphyleneoxide | SABIC |
| Toluene | Methylbenzene (>99.5%, Certified ACS reagent grade) | Fisher Scientific |
| Chloroform | Chloroform (99+%, extra pure, stabilized with ethanol) | Acros Organics |

Distributions of fiber diameters were measured by imaging the sample using a Phenom Pro Desktop, scanning electron microscope (SEM). A minimum magnification of 140× was used. A minimum of 4 images are retained for fiber diameter analysis. Fiber diameter analysis software (e.g., Fibermetric software) is used to measure the sample's images and at least 100 measurements per image, which are randomly selected by the software, are used in determining the average fiber diameter and distribution.

Example 1

A solution comprising of 8 wt. % PPO6130 dissolved in Toluene, with a solution viscosity of about 100 cP was spun through an orifice diameter of 337 μm (23G) at a spinneret speed of 6,000 RPM. The example resulted in fito 3.9 μm with an average fiber diameter of about 840 nm.

Figure 4A:
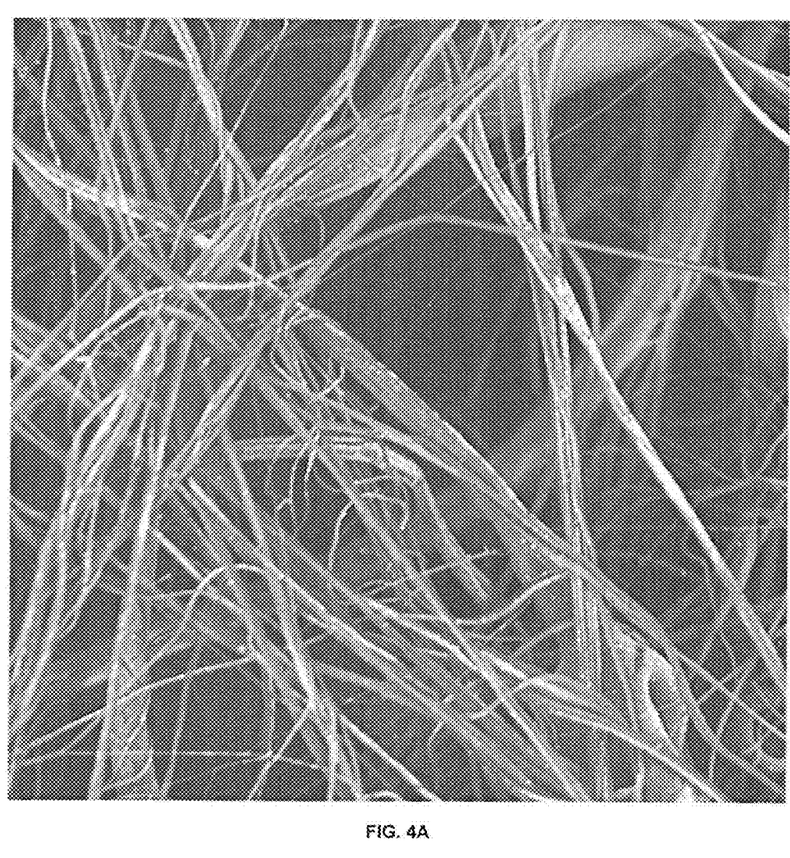
FIG. 4A: is an image showing the fiber morphology obtained according to Example 1.
Figure 4B:
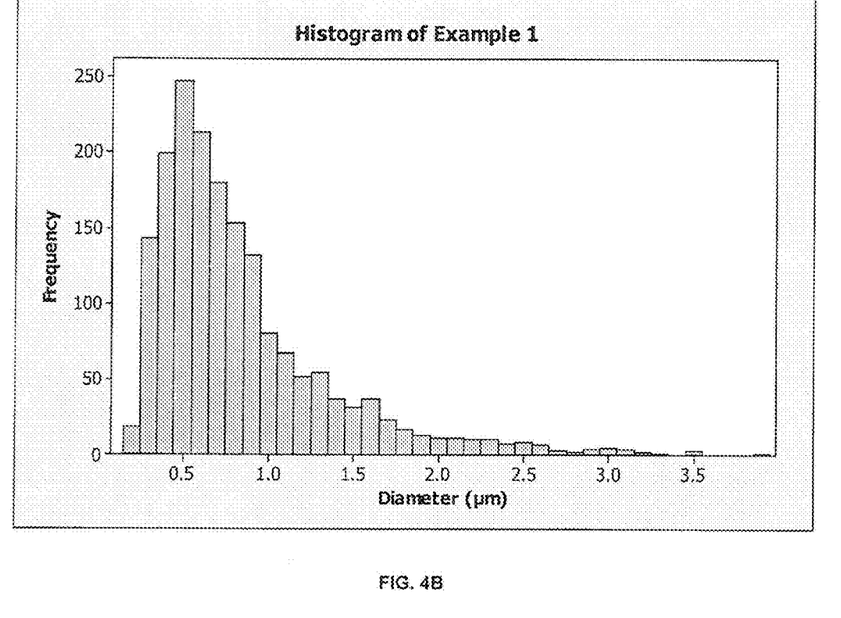
FIG. 4B: is a histogram showing fiber diameter measurements obtained according to Example 1.

FIG. 4A is an image showing the fiber morphology obtained according to Example 1. FIG. 4B is a histogram showing fiber diameter measurements obtained according to Example 1.

Example 2

A solution comprising of 8 wt. % PPO6130 dissolved in a mixture of 50% Toluene and 50% Chloroform, with a solution viscosity of about 400 cP was spun through an orifice diameter of 159 μm (30G) at a spinneret speed of 12,000 RPM. The example resulted in fibers with a diameter between 70 nm and 6.2 μm with an average fiber diameter of 1.6 μm.

Figure 5A:
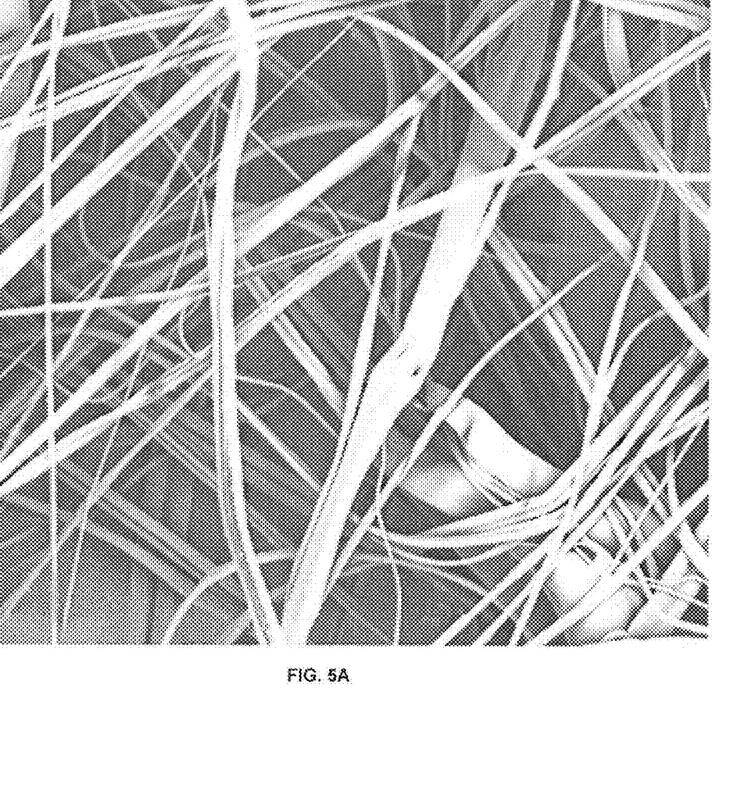
FIG. 5A: is an image showing the fiber morphology obtained according to Example 2.
Figure 5B:
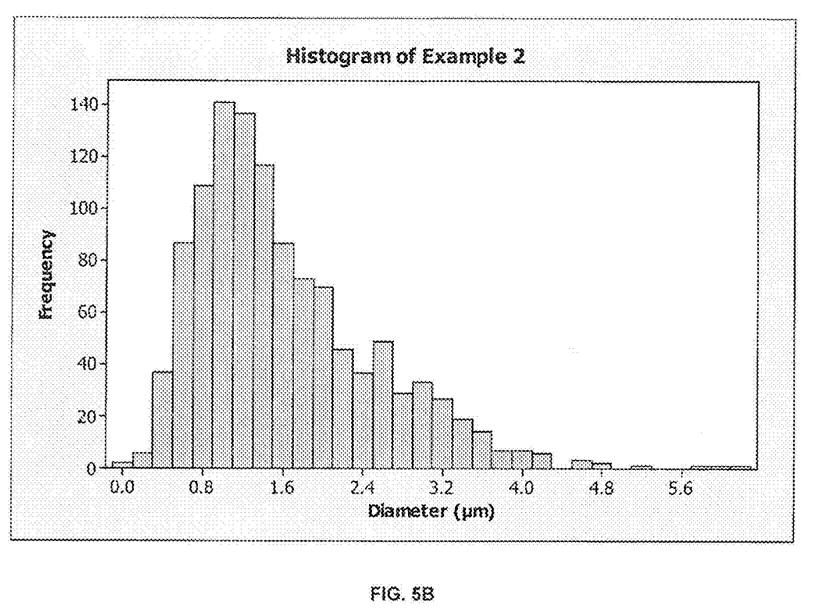
FIG. 5B: is a histogram showing fiber diameter measurements obtained according to Example 2.

FIG. 5A is an image showing the fiber morphology obtained according to Example 2. FIG. 5B is a histogram showing fiber diameter measurements obtained according to Example 2.

Example 3

A solution comprising of 8 wt. % PPO6130 dissolved in Chloroform, with a solution viscosity of about 900 cP was spun through an orifice diameter of 337 μm (23G) at a spinneret speed of 10,000 RPM. The example resulted in fibers with a diameter between 275 nm and 23.4 μm with an average fiber diameter of 7.3 μm. Fig.

Figure 6A:
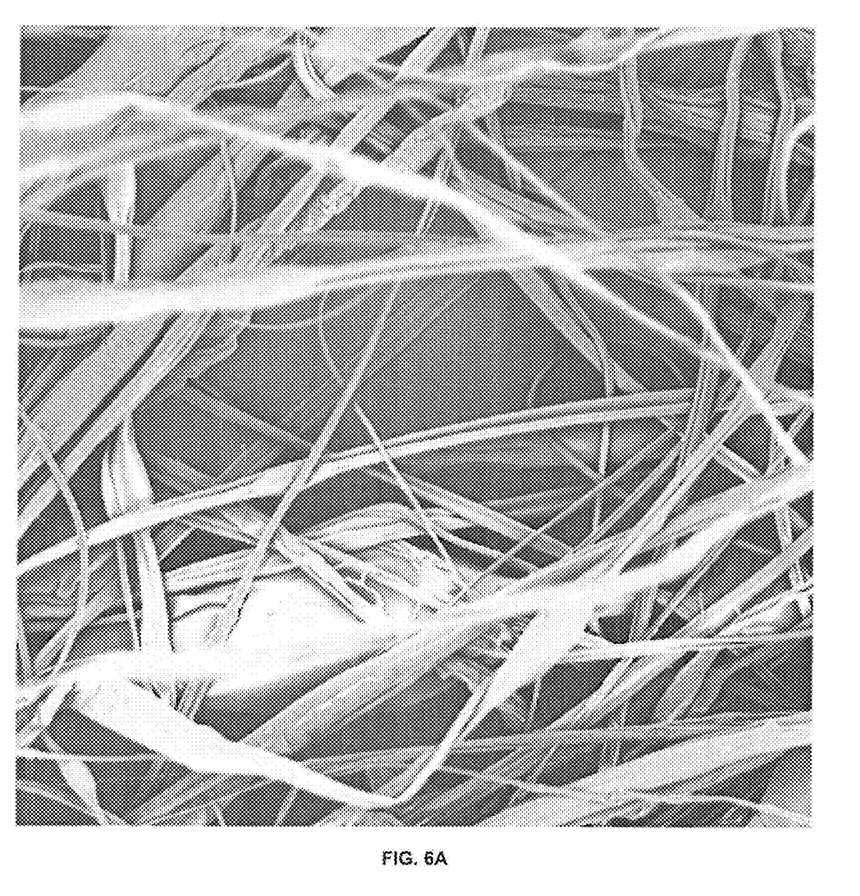
FIG. 6A: is an image showing the fiber morphology obtained according to Example 3.
Figure 6B:
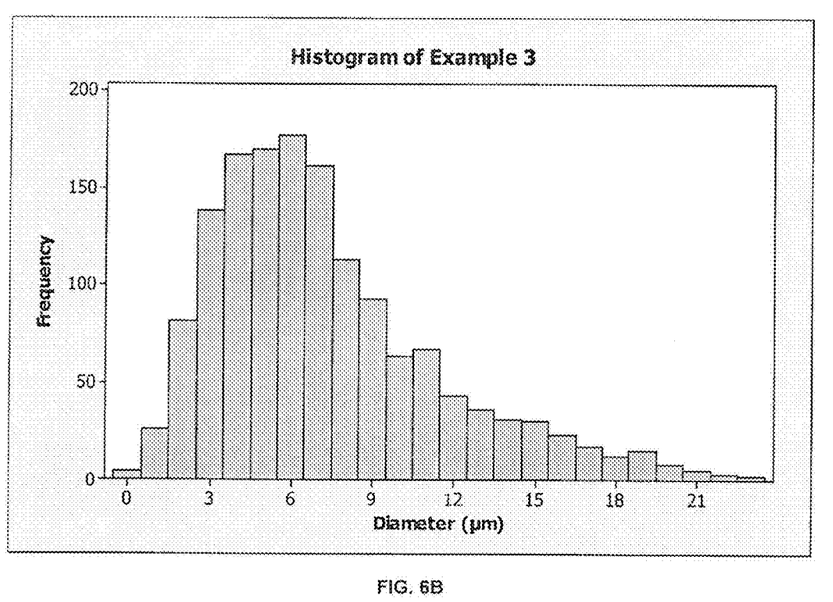
FIG. 6B: is a histogram showing fiber diameter measurements obtained according to Example 3.

FIG. 6A is an image showing the fiber morphology obtained according to Example 3. FIG. 6B is a histogram showing fiber diameter measurements obtained according to Example 3.

Example 4

A solution comprising of 5 wt. % PPO6130 dissolved in Toluene, with a solution viscosity of about 30 cP was spun through an orifice diameter of 210 μm (27G) at a spinneret speed of 2,000 RPM. The example resulted in no formation of fibers.

Example 5

A solution comprising of 8 wt. % PPO6130 dissolved in Chloroform, with a solution viscosity of about 900 cP was spun through an orifice diameter of 337 μm (23G) at a spinneret speed of 6,000 RPM. The example resulted in no formation of fibers,

Example 6

A solution comprising of 2.5 wt. % PPO6130 dissolved in a mixture of 50% Chloroform and 50% Toluene, with a solution viscosity of about 10 cP was spun through an orifice diameter of 337 μm (23G) at a spinneret speed of 12,000 RPM. The example resulted in no formation of fibers.

Although the present invention has been described in considerable detail with reference to certain preferred versions thereof, other versions are possible. Therefore, the spirit and scope of the appended claims should not be limited to the description of the preferred versions contained herein.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C § 112, sixth paragraph. In particular, the use of "step of" in the claims herein is not intended to invoke the provisions of 35 U.S.C § 112, sixth paragraph.

What is claimed is:

1. A process comprising:
spinning a plurality of continuous polymeric filaments by passing a mixture of at least one polymeric component and a solvent through a rotating spinneret having a plurality of orifices,
wherein the at least one polymeric component comprises one selected from the group consisting of a poly(phenylene ether) component, a poly(phenylene ether)-polysiloxane block copolymer, and combinations thereof,
wherein the solvent comprises benzene, toluene, xylene, chlorobenzene, chloroform, carbon tetrachloride, alcohols, ketones, anisole, veratrole, dichloroethane, trichloroethane or a combination thereof,
wherein the mixture has a viscosity greater than 100 centipoise,
wherein each of the plurality of continuous polymeric filaments has a length to diameter ratio that is more than 1,000,000,
wherein each of the plurality of continuous polymeric filaments has a diameter ranging from 50 nanometers to 5 microns,
wherein the spinning is conducted in a non-electrospinning environment and at greater than or equal to 6000 rotations per minute,
wherein the spinning is conducted at a rate of at least 300 grams/hour/spinneret; and
producing a non-woven web comprising the plurality of continuous polymeric filaments,
wherein the non-woven web has a width of at least 150 mm.

2. The process of claim 1, wherein producing the non-woven web comprises depositing the plurality of continuous filaments onto one selected from the group consisting of a carrier substrate, a functional sheet, a film, a non-woven, a rolled good product, and combinations thereof.

3. The process of claim 2, wherein the carrier substrate is a reciprocating belt.

4. The process of claim 2, further comprising solidifying the plurality of continuous polymeric filaments before the depositing step.

5. The process of claim 1, wherein the non-woven web is unconsolidated.

6. The process of claim 1, further comprising consolidating the non-woven web.

7. The process of claim 1, further comprising consolidating the non-woven web under pressure.

8. The process of claim 1, wherein the spinning is conducted at a rate of at least 7000 grams/hour/spinerret.

9. The process of claim 1, wherein each of the plurality of continuous polymeric filaments is provided with at least one additional functionality imparting at least one selected from the group consisting of therapeutic activity, catalytic activity microelectronic activity, micro-optoelectronic activity, magnetic activity, biological activity, and combinations thereof.

10. The process of claim 1, wherein none of the plurality of continuous polymeric filaments are bonded to adjacent filaments.

11. The process of claim 1, wherein a portion of the plurality of continuous polymeric filaments are at least partially bonded to adjacent filaments.

12. The process of claim 1, wherein each of the plurality of continuous polymeric filaments are at least partially bonded to adjacent filaments.

13. The process of claim 1, further comprising entangling the the plurality of continuous polymeric filaments.

14. The process of claim 13, wherein the entangling is one of needle-punching and fluid hydroentangement.

15. The process of claim 1, wherein the poly(phenylene ether) component comprises repeating structural units having the formula:

wherein each occurrence of $Z^1$ is independently halogen, unsubstituted or substituted C1-C12 hydrocarbyl provided that the hydrocarbyl group is not tertiary hydrocarbyl, C1-C12 hydrocarbylthio, C1-C12 hydrocarbyloxy, or C2-C12 halohydrocarbyloxy wherein at least two carbon atoms separate the halogen and oxygen atoms; and
wherein each occurrence of $Z^2$ is independently hydrogen, halogen, unsubstituted or substituted C1-C12 hydrocarbyl provided that the hydrocarbyl group is not tertiary hydrocarbyl, C1-C12 hydrocarbylthio, C1-C12 hydrocarbyloxy, or C2-C12 halohydrocarbyloxy wherein at least two carbon atoms separate the halogen and oxygen atoms.

16. The process of claim 1, wherein the poly(phenylene ether)-polysiloxane block copolymer is prepared by an oxidative copolymerization method.

17. The process of claim 1, wherein the poly(phenylene ether) component comprises a homopolymer or copolymer of monomers selected from the group consisting of 2,6 dimethylphenol, 2,3,6 trimethylphenol, and combinations thereof.

18. The process of claim 1, further comprising at least partially removing the solvent from the plurality of continuous polymeric filaments before the plurality of continuous polymeric filaments are deposited.

19. The process of claim 1, wherein the solvent is a chlorinated solvent.

20. The process of claim 1, wherein the non-woven web contains less than 10 wt % of a material selected from the group consisting of polyvinyl pyrrolidine, polymethyl methacrylate, polyvinylidence fluoride, polypropylene, polycarbonate, polyethylene oxide, agarose, polyvinylidene fluoride, polylactic glycolic acid, nylon 6, polycaprolactone, polylactic acid, polybutylene terephthalate, polyetherimide homopolymers, polyetherimide co-polymers, polyetherether ketones homopolymers, polyetherether ketones copolymers, polyphenylene sulfones homopolymers, polyphenylene sulfones copolymers, polycarbonate homopolymers, polycarbonate copolymers, and combinations thereof.

21. The process of claim 1, wherein the process excludes any detectable amount of a material selected form the group consisting of polyvinyl pyrrolidine, polymethyl methacrylate, polyvinylidene fluoride, polypropylene, polycarbonate, polyethylene oxide, agarose, polyvinylidene fluoride, polylactic glycolic acid, nylon 6, polycaprolactone, polylactic acid, polybutylene terepthalate, and combinations thereof.

22. A process of forming a non-woven web, said process comprising:
spinning a plurality of continuous polymeric filaments comprising one selected from the group consisting of a poly(phenylene ether) component, a poly(phenylene ether)-polysiloxane block copolymer, and combinations thereof,
the plurality of continuous polymeric filaments having a length to diameter ratio that is more than 1,000,000, and a diameter ranging from 50 nanometers to 5 microns;
said spinning comprising passing a mixture of at least one polymer and a solvent through a rotating spinneret having a plurality of orifices at greater than or equal to 6000 rotations per minute in a non-electrospinning environment;
chopping the plurality of continuous filaments and obtaining a plurality of chopped nano-fibers;
forming the plurality of chopped nano-fibers into a non-woven web;
the spinning being conducted at a rate of at least 300 grams/hour/spinneret, and
wherein the solvent comprises benzene, toluene, xylene, chlorobenzene, chloroform, carbon tetrachloride, alcohols, ketones, anisole, veratrole, dichloroethane, trichloroethane or a combination thereof, wherein the mixture has a viscosity greater than 100 centipoise.

23. The process of claim 22, wherein none of the plurality of continuous polymeric filaments are bonded to adjacent filaments.

24. The process of claim 22, wherein a portion of the plurality of continuous polymeric filaments are at least partially bonded to adjacent filaments.

25. The process of claim 22, wherein each of the plurality of continuous polymeric filaments are at least partially bonded to adjacent filaments.

26. The process of claim 22, further comprising entangling the plurality of continuous polymeric filaments.

27. The process of claim 22, wherein the non-woven web contains less than 10 wt % of a material selected from the group consisting of polyvinyl pyrrolidine, polymethyl methacrylate, polyvinylidene fluoride, polypropylene, polycarbonate, polyethylene oxide, agarose, polyvinylidene fluoride, polylactic glycolic acid, nylon 6, polycaprolactone, polylactic acid, polybutylene terepthalate, polyetherimide homopolymers, polyetherimide co-polymers, polyetherether ketones homopolymers, polyetherether ketones copolymers, polyphenylene sulfones homopolymers, polyphenylene sulfones copolymers, polycarbonate homopolymers, polycarbonate copolymers, and combinations thereof.

* * * * *